United States Patent [19]
Greif

[11] Patent Number: 6,024,469
[45] Date of Patent: Feb. 15, 2000

[54] REFLECTOR FOR LIGHT RADIATION SOURCE

[75] Inventor: Stefan Greif, Fulda, Germany

[73] Assignee: Heraeus Noblelight GmbH, Hanau, Germany

[21] Appl. No.: 09/189,677

[22] Filed: Nov. 13, 1998

[30] Foreign Application Priority Data

Nov. 13, 1997 [DE] Germany .......................... 197 50 269

[51] Int. Cl.[7] .................................................. F21V 5/00
[52] U.S. Cl. ......................... 362/346; 362/350; 362/278; 362/320
[58] Field of Search .................................. 362/278, 320, 362/297, 346, 350, 347, 341, 296

[56] References Cited

U.S. PATENT DOCUMENTS

| | | |
|---|---|---|
| 2,513,961 | 7/1950 | Ostrom . |
| 2,586,583 | 2/1952 | Wagner . |
| 2,806,134 | 9/1957 | Tarcici . |
| 2,907,873 | 10/1959 | Smith . |
| 4,242,727 | 12/1980 | de Vos et al. ............................ 362/346 |
| 4,855,884 | 8/1989 | Richardson ............................. 362/278 |
| 5,287,259 | 2/1994 | Lautzenheiser ........................ 362/341 |
| 5,938,317 | 8/1999 | Thornton ................................ 362/290 |

*Primary Examiner*—Laura K. Tso
*Attorney, Agent, or Firm*—Oblon, Spivak, McClelland, Maier & Neustadt, P.C.

[57] ABSTRACT

A blank for a one piece reflector for a light radiation source is formed as a unitary part having a reflecting surface. It includes a continuous elongated rim; a plurality of segments extending from one side of the rim and spaced along the length of said rim, the segments being separated by recesses each having a tip extending to the one side of the rim; and a flap extending from a side of the rim opposite the segments. The flap has notches aligned with the recess tips.

13 Claims, 4 Drawing Sheets

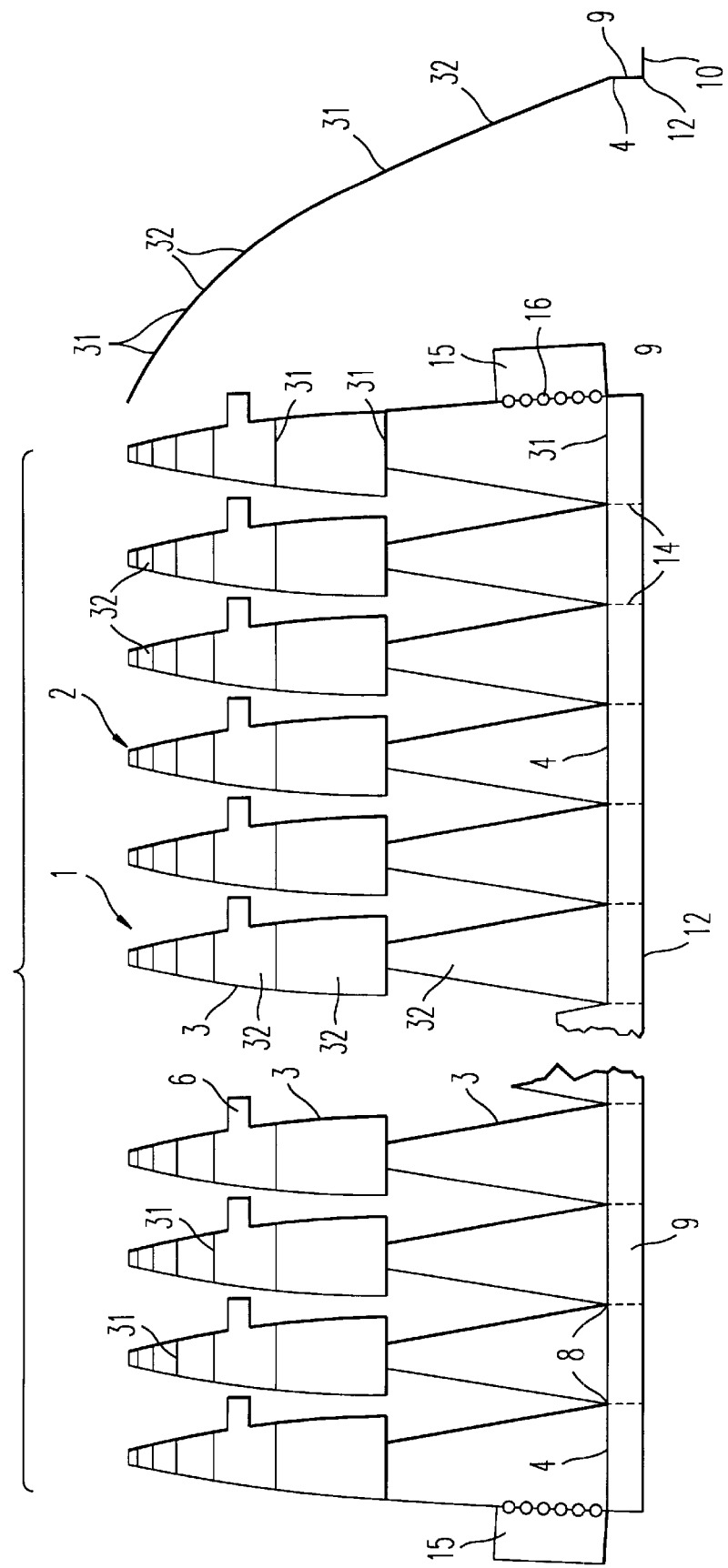

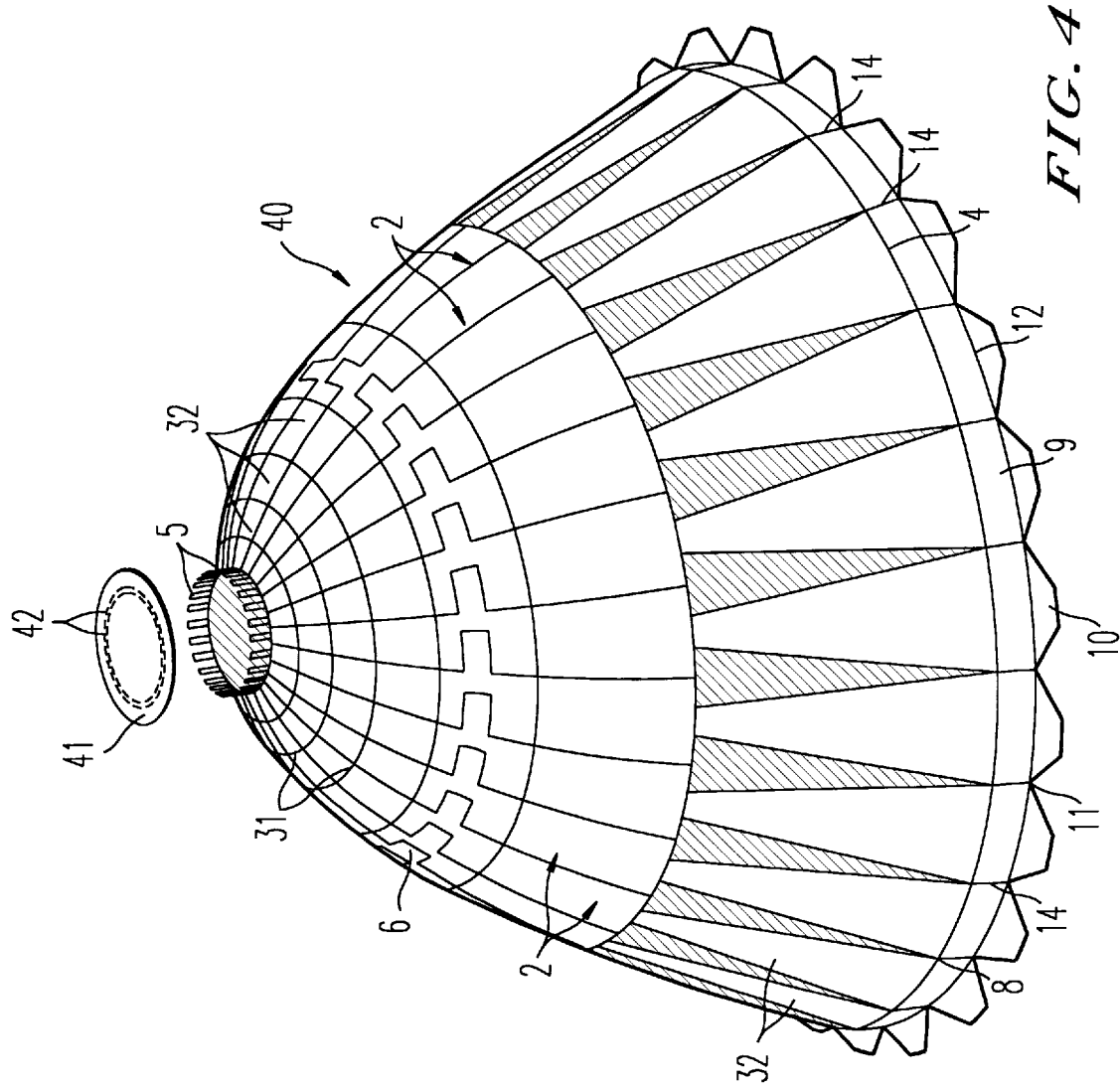

REFLECTOR FOR LIGHT RADIATION SOURCE

BACKGROUND OF THE INVENTION

1. Field of the Invention

The invention concerns a reflector for a light radiation source, comprising a number of wedge-shaped reflector segments that have a top, a bottom and two side walls, respectively, and which when arranged in groups with their side walls next to each other form an annular body which encloses a hollow space defined by a reflecting interior surface whose opening is limited by an opening plane.

2. Description of the Related Art

U.S. Pat. No. 5,287,259 describes such a reflector. It consists of eight segments of the same design and made of aluminum sheets. The segments each have an upper edge, a lower edge, and two tapered side edges. The upper and lower edges are basically parallel and are bent in the direction of the side walls.

All edges are equipped with flanges or collars. To assemble the reflector, the segments are aligned in groups with their side walls next to each other. In doing so, they enclose a hollow space that is internally metallized and whose free rim is formed by the lower edges that are placed next to each other. The respective flanges or collars serve the purpose of connecting the individual segments. A tension ring embraces the collars of the upper edges. The lower edge flanges are bent hook-like to the inside, which causes them to form a continuous loop when placed next to each other, into which a retaining ring is inserted. The lengthwise edges of neighboring segments are located next to each other with flanges that are canted outward vertically; the flanges are simultaneously embraced by a U-beam.

The segments are stamped. For mechanical strength, they can be equipped with lengthwise accordion-like ribs. Bevel-like surfaces extending in the direction of the lengthwise edges are thus formed and serve the purpose of light guidance.

The higher the number of segments, the more the radiation coming from the radiation source is concentrated. On the other hand, this also increases the effort required for assembly. With the known reflector, individual segments have to be connected together and adjusted to each other with a lot of effort. Additionally, exact reproductions or the creation of similar versions of beveled segments requires great care during the stamping and bending of the segments.

SUMMARY OF THE INVENTION

It is an object of the present invention to provide a reflector which can be produced in a simple and inexpensive manner.

This and other objects are achieved according to the invention by a reflector having individual reflector segments connected with each other via a rim extending perpendicular to the opening plane of the hollow space in the area of the reflector bottoms, and having parallel bending lines between neighboring reflector segments.

The reflector segments are formed from a single blank, for example, a reflector sheet or a metallized or metallizable polymer plate. During production, all segments are jointly subjected to the respective manufacturing steps. A blank having a connected row of segments is produced, for example, by stamping. The segment row is then subjected to a joint bending process. The bent segments are curved and bent at the bending lines to form the reflector by placing their end side walls next to each other. This ensures low production cost and exact and reproducible shapes.

This is true in particular for a reflector with planar segments. In the case of a plane-parallel row of reflector segments, for example, bending lines that run parallel to the lower edge across the entire segment row and that divide each individual segment into plane elements can be produced in a joint bending process. Such plane elements that extend between the lengthwise sides of the segments are called bevels in the following. Producing the bevel shapes in a bending process that is uniform for all segments ensures higher reproducibility and facilitates, if desired, the production of reflector segments with exactly the same layout.

The individual segments are connected with each other via a rim located in the area of the bottoms. The rim represents a prefabricated "connection" of the reflector segments. This prefabricated connection eliminates connecting efforts required during assembly of the reflector. The rim is an integral component placing the reflector segments next to each other and thus firmly establishes their geometrical position and relative arrangement. This simplifies the segments' adjustment relative to each other.

The rim is provided in the area of the segment bottoms. When placing the end reflector segments next to each other to form the reflector, the rim is bent around the opening of a circular space. In the case of rotationally symmetrical spaces, it basically runs coaxially around the rotation axis. The rim then has an annular surface that is perpendicular to the opening plane. This rim has parallel bending hinges between neighboring reflector segments. The bending hinges run perpendicular to the opening plane. By folding the rim at the bending hinges, there results a shape that revolves around the opening of the completely assembled reflector.

Due to the joint production of segments and their simple assembly and adjustment, the reflector according to the invention can be assembled with a relatively high number of reflector segments with relatively little effort. Instead of only one arrangement of reflector segments, the reflector can also be composed of several arrangements of reflector segments.

The reflector segments do not have to be exactly wedge-shaped. It is only important that the segments can enclose a hollow space having a generally annular opening, without creating reciprocal hindering overlapping areas of the segments next to each other, when they are bent convexially toward the center line. Adjacent segment bottoms define the limits of the opening of the hollow space in the opening plane. In the case of a rotationally symmetrical hollow space, the rotation axis runs perpendicular to the opening plane. In addition to the opening limited by the bottom of the segments, the hollow space can have further openings, in particular an opposite second opening limited by the tops of the segments. The shape of the segment tops is not an important aspect of the invention; the tops can, for example, be rounded off, have a tip, or be shaped like a peg.

Before final assembly of the reflector, the blank consists of a plane-parallel row of reflector segments or a row that is bent in one direction. The space requirement of such a segment row is low, which facilitates storage and transport. Final assembly of the reflector from a segment row is done by simply folding around the bending hinges. The production of reflector segments incurs only low tooling costs. Apart from stamping or bending tooling, special tools are not needed so that the reflector according to the invention is particularly suited the production of models or samples.

It has proven particularly beneficial that the rim is equipped with a bent flap which has a notch in the area of each bending hinge. The flap reinforces the rim and increases bending resistance, except at the bending hinge. The angle of the bend plays no substantial role; it can, for example, be between 30° and 180°. The notch specifies the position of the bending hinge. It is advantageous if the notch has a tip that ends on the bending hinge. The notch can, for example, be wedge shaped. The tip determines the lower end of the bending hinge. This leads to an exact geometrical and reproducible position and shape of the bending hinges and facilitates assembly of the reflector.

It has proven especially advantageous to also establish the upper end of the bending hinge. This is achieved by a recess at the top of the rim in the area of the bending hinge. The recess can be designed, for example, as a bore or as a straight or wedge-shaped slot. The bending hinge is specified precisely if the recess has a tip that ends on the bending edge. Alternatively or parallel to the mentioned recess, the bending hinge can have a bore. The bore reduces the rim's wall thickness in the area of the bending hinge, which in turn decreases the rim's resistance against bending around the bending hinge. Thus the bottom of the bending hinge is specified by a bending flap with a notch and the top thereof is specified by a recess or a weakening of the wall thickness.

In another preferred version, the recesses above the rim serves the purpose of louvers.

One version of the reflector that has proven particularly beneficial has at least 10, but no more than 72, reflector segments that enclose the hollow space. The lower limit results from the increasing number of cuttings for a decreasing number of reflector segments during production of the segment row. The upper limit results from the increasingly unstable arrangement with an increasing number of segments. The preferred number of reflector segments that enclose the hollow space is between 15 and 30.

The invention has proved particularly useful on a reflector where the reflector segments are formed by several plane elements that are connected with each other at borders running perpendicular to the bending hinges. In the case of this version of the reflector with bevel-like segments, production and assembly are particularly simple. For a plane-parallel row of reflector segments, for example, the borders between the plane elements can be produced in a single bending process throughout the entire segment row. Shaping the bevels in a bending process that is uniform for all segments guarantees higher reproducibility and facilities, if desired, the production of reflector segments that share exactly the same design. It is, however, not required that all reflector segments of one reflector have the same design. In the case of reflector segments of the same design, the side wall extensions beyond the top each include the same angle, up to a maximum of 120°, that can be divided integrally by 360.

With regard to simpler assembly, it has proven especially advantageous to equip the side walls of the reflector segments each with a flap that has an imbricated layout with the neighboring reflector segment when placing the segments next to each other. The flaps each protrude sideways from one of the side walls. To avoid undefined cants, they can also be offset by about one segment wall thickness towards the segment top.

According to another feature of the invention, a blank for a one piece reflector for a light radiation source comprises a unitary part having a reflecting surface and includes a continuous elongated rim; a plurality of segments extending from one side of said rim and spaced along the length of said rim, said segments being separated by recesses each having a tip extending to the one side of said rim; and a flap extending from a side of said rim opposite said segments, said flap having notches aligned with said recess.

BRIEF DESCRIPTION OF THE DRAWINGS

In the following, the invention is explained in greater detail with the help of the following drawings, in which:

FIG. 3a is a front view of the stamped bending part shown in FIG. 1 after bending;

FIG. 3b is a side view of the stamped bending part shown in FIG. 3a; and

FIG. 4 shows a formed reflector according to the invention with the end reflector segments of FIG. 1 placed next to each other.

DETAILED DESCRIPTION OF THE PREFERRED EMBODIMENTS

Figure 1:
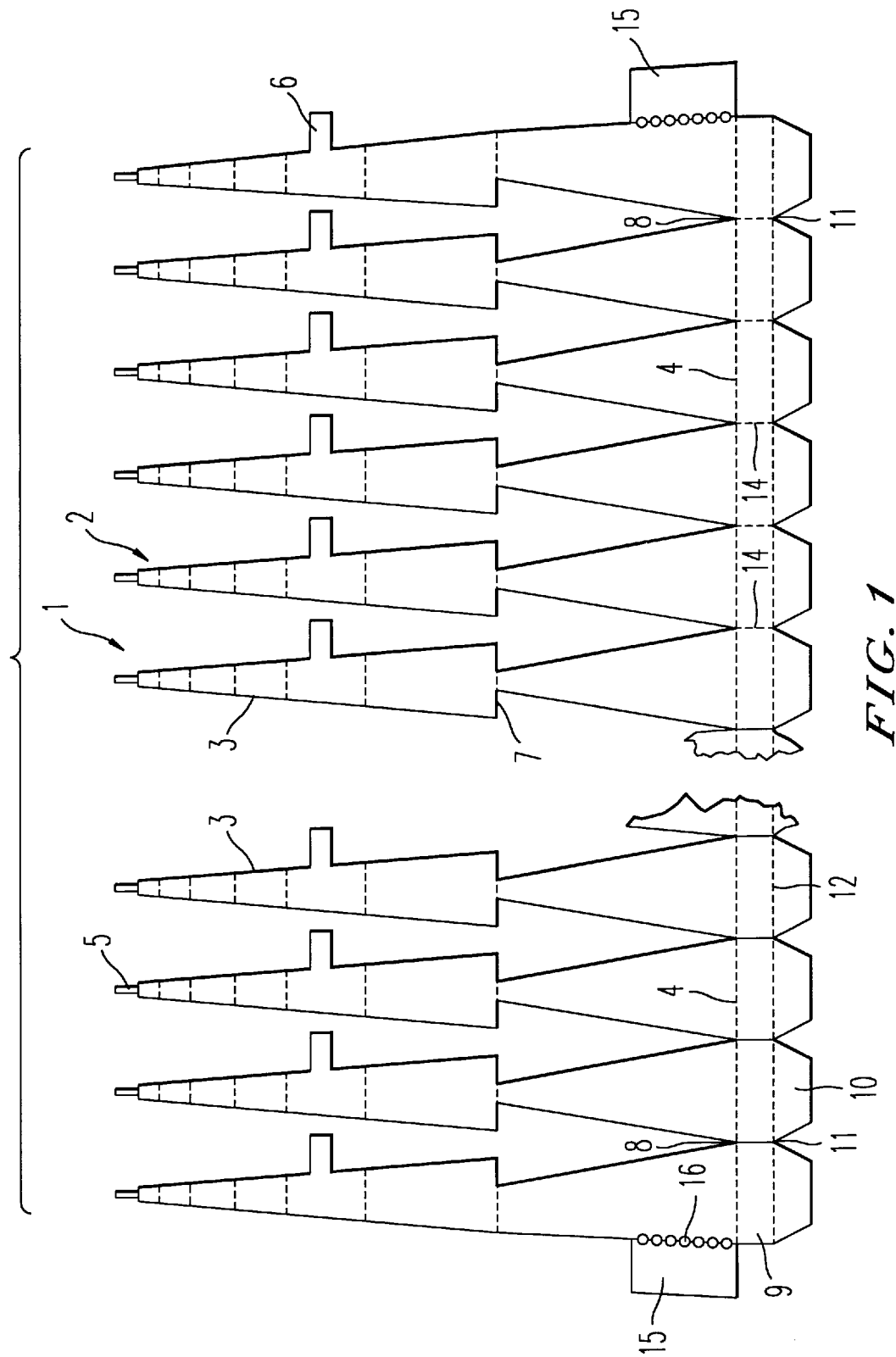
FIG. 1 is a front view of a stamped bending part with a plane-parallel row of reflector segments.
Figure 2:
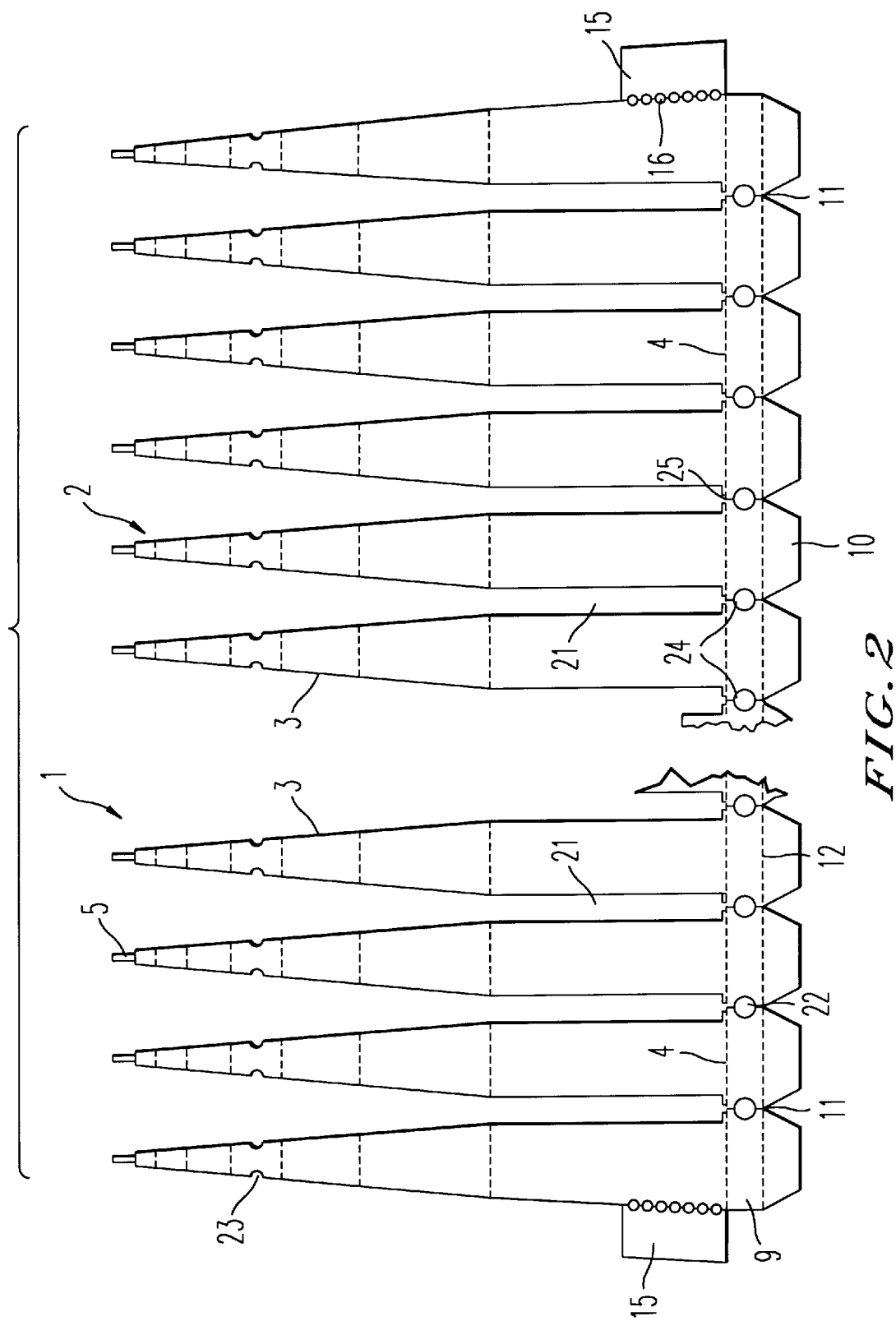
FIG. 2 is a front view of a second version of a stamped bending part with a plane-parallel row of reflector segments.

Referring to FIGS. 1 and 2, a plane stamped bending part or blank 1, made from 0.5 mm aluminum sheet, consists of 35 basically wedge-shaped reflector segments 2 that are arranged parallel to each other in a row. For purposes of clarity, the entire row of segments 2 is not shown in the sketches. Except for the end reflector segments of the row, the reflector segments 2 are identical. In this figure, the dashed lines designate bending or fold lines where the blank that will be bent in a later step (see FIG. 3a). The individual reflector segments 2 are basically wedge-shaped with tapered flanks 3, a wide bottom end and a narrow upper end shaped like a peg 5. The bottom end has a bottom fold line 4 a length of about 4 cm. Similarly fold lines running parallel to the fold line 4 designate where further bends are to be formed. The flanks 3, which are about 15 cm long, each enclose a 20° angle. The segment half having the peg 5 is the upper half of a segment 2, the segment half having the bottom fold line 4 is the bottom half.

In the reflector shown in FIG. 1, in each segment 2 the right flank 3 (from the front view) has in its upper half a flap 6 that protrudes sideways. In the lower half of the segments 2, the flanks 3 have a step 7, with the steps 7 of neighboring segments 2 forming a wedge-like groove whose tip 8 ends at the bottom fold line 4. The segments 2 are connected with each other below the bottom fold line 4 via a rim 9. The bottom fold line 4 therefore defines the upper limit of the rim 9. The rim 9, which is 5 mm wide, is an integral part of the stamped bending part or blank 1. Below the fold line 12 defining the bottom of the rim 9, there is a flange 10. The flange 10 has a notch between neighboring segments 2, whose tip 11 ends at the fold line at the bottom 12 of the rim 9, and opposite the tip 8. The two opposing tips 8 and 11 thus define a bending hinge 14 between two neighboring segments 2. The tips 8 and 11 exactly determine the geometrical position and course (symbolized by dashed lines) of the bending hinge 14. Put another way, a plurality of segments 1 may be viewed as extending from one side of a rim and spaced along the length of said rim, the segments 1 being separated by recesses each having a tip 8 extending to the one side of said rim; and a flap 10 extending from a side of said rim opposite the segments, the flap having notches 11 aligned with the recess tips.

In a subsequent process step, the flange 10 is bent along the fold line 12 by 90°. The fold line 12 thus forms the bottom edge of the reflector, and the bent flange 10 serves for fastening the reflector on a lamp housing (not shown) and to rigidify the rim 9 against bending, except at the bending hinges 14. Since the bending resistance of the rim 9 is lowest at the bending hinges 14, the precision of the subsequent bending at the bending hinges 14 is increased.

On the reflector blank end segment 2 of the row, there is a holding flap 15 facing outside. During assembly of the reflector, the reflector segments are curved to form a hollow space (FIG. 4), with bending at the hinges 14 and the fold lines, until the two holding flaps 15 overlap. In order to prevent the overlapped flaps from deforming the shape of the hollow space, the wall strength is decreased in the area of the holding flaps through bores 16.

Referring to the embodiment of FIG. 2, in which similar or equivalent components of the embodiment shown in FIG. 1 have the same reference numbers, the lower half of segment 2 has flanks 3 that run parallel to each other, with a gap 21 that is approximately 4 mm wide being provided between neighboring segments 2. The gap 21 ends at the lower fold line 4 at a semicircular recess 25 with a diameter of 0.5 mm.

In the area above the gap 21, the flanks 3 extend wedge-like towards each other, with both flanks 3 of each segment 2 having a semicircular recess 23 with a radius of 1 mm. The recesses 23 serve as adjustment aids during the bending process of the stamped bending part. When placing the end segments 2 next to each other to form the finished reflector assembly, neighboring recesses 23 form circular vent openings to enhance reflector cooling. The segments 2 are connected with each other via a 5 mm wide rim 9, which is an integral component of the stamped bending part 1.

The recesses 25 and the tips 11 opposite each bore define the ends of a bending hinge 24 between any two neighboring segments 2. A through bore 22 in the rim 9, having a diameter of 3 mm, additionally reduces the wall thickness in the area of each bending hinge 24. This aids in the precision of the geometrical position and course of the bending hinges 24. In a subsequent process step, the flange 10 is bent along the folding line 12 by 90° for fastening the reflector on a lamp housing (not shown). As a result, the bending resistance of the rim 9 is increased as compared to the bending hinges 24, contributing to the stability of the bending at the bending hinges 24.

On the stamped bending part 1 according to FIG. 3a the reflector segments 2 of FIG. 1 are shown after bending at the fold lines 31. During this bending procedure, all reflector segments 2 are canted jointly by a small angle of less than 10° around the bottom fold line and the other fold lines that run parallel thereto. Due to this bending process, the segments 2 receive a curve; e.g., a convex curve which may be elliptical or hyperbolic and which mainly corresponds to that of the completely assembled reflector, as can be better seen from the side view in FIG. 3b. Through this bending process, plane bevels 32 that are connected with each other are created between the fold lines 31.

For final assembly of the reflector, the stamped bending part 1 shown in FIGS. 3a and 3b is curved or folded into a hollow space while bending along the bending hinges 14. A completely assembled reflector 40—except for insertion of the retaining ring 41—is shown in FIG. 4. The reflector 40 consists of a total of 36 wedge shaped segments 2, which enclose a hollow space. The opening of the hollow space defines an opening plane having the flanges 10. The rim 9 runs perpendicular to this opening plane, as do the bending hinges 14. The segments 2 are connected with each other via the annular rim 9. The pegs 5 of the segments 2 are bent and connected with a retaining ring 41. For this, the retaining ring 41 has a total of 36 holes 42 that are distributed evenly around the inner circumference, in which one peg 5, respectively, is placed and then further bent. The imbricated overlapping arrangement of the flaps 6 additionally serves to mechanically stabilize the reflector 1.

Folding the stamped bending part 1 along the bending hinges 14 is particularly simple since the geometrical position and course of the bending hinges 14 are exactly specified, as explained in detail above. Extensive adjustments or assembly work is not required.

The reflector according to the invention is assembled from a simple stamped bending part or blank. Apart from a stamping tool and a bending press no special tools such as power presses or deep-drawing tools are required for the production of the stamped bending part. Therefore the reflector is particularly suited for manufacturing samples or low production quantities. Since the reflector can be mounted easily "upon the spot," the stamped bending parts can be delivered and stored unassembled. Due to the small space requirements, transportation or storage costs of the stamped bending parts are low. There are numerous application areas for the reflector according to the invention; it is suited, for example, in combination with UV lamps for tanning benches, for phototherapy, for reprographics or for medical lighting equipment.

I claim:

1. A reflector for a light radiation source, comprising a plurality of wedge-shaped reflector segments, each of said segments having a top, a bottom and two side walls, wherein when the segments are arranged such that the side walls are next to each other, the segments enclose a hollow space with a reflecting interior surface and a planar bottom opening limited by the bottoms of the segments, and wherein the reflector segments are connected with each other via a rim which extends perpendicular to the opening plane and defines parallel bending hinges between neighboring reflector segments.

2. The reflector according to claim 1, further comprising a bent flap connected to the rim, wherein said flap has a notch at each of the bending hinges.

3. The reflector according to claim 2, wherein each said notch has a tip that ends at one of said bending hinges.

4. The reflector according to claim 1, further comprising recesses provided at locations so as to define an end of each of said bending hinges.

5. The reflector according to claim 4, wherein each said recess ends in a tip at the bending hinge.

6. The reflector according to claim 4, wherein each said recess comprises a louver.

7. The reflector according to claim 1, wherein there are between 10 and 72 of said reflector segments.

8. The reflector according to claim 1, wherein there are between 16 and 30 of said reflector segments.

9. The reflector according to claim 1, wherein said reflector segments are each formed as several plane elements that are connected with each other at borders that are perpendicular to the bending hinges.

10. The reflector according to claim 1, further comprising a flap extending from one of the side walls of each of the reflector segments so as to create an imbricated structure with a neighboring reflector segment.

11. A blank for a one piece reflector for a light radiation source, said blank comprising a unitary part having a reflecting surface and including:
   a continuous elongated rim;
   a plurality of segments extending from one side of said rim and spaced along the length of said rim, said segments being separated by recesses each having a tip extending to the one side of said rim; and
   a flap extending from a side of said rim opposite said segments, said flap having notches aligned with said recess tips along the length of said rim to define bending hinges along said rim.

12. The blank of claim 11, wherein said segments are in a direction tapered away from said rim.

13. The blank of claim 11, further comprising a flap extending from one side wall of each of the segments.

* * * * *